May 1, 1928.
B. D. DYKES
VEHICLE CHECKING DEVICE
Filed Sept. 30, 1925
1,667,725
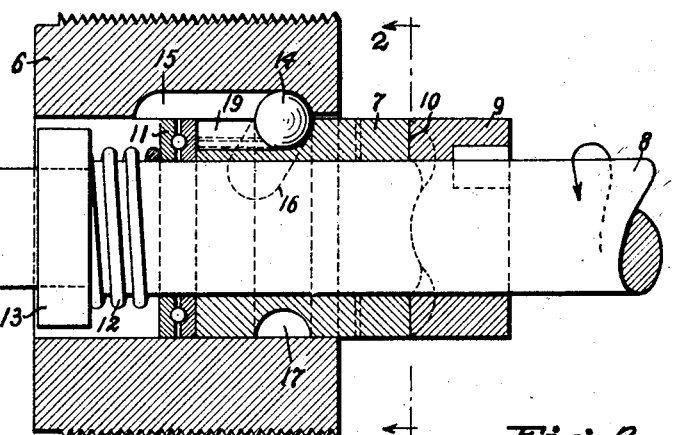
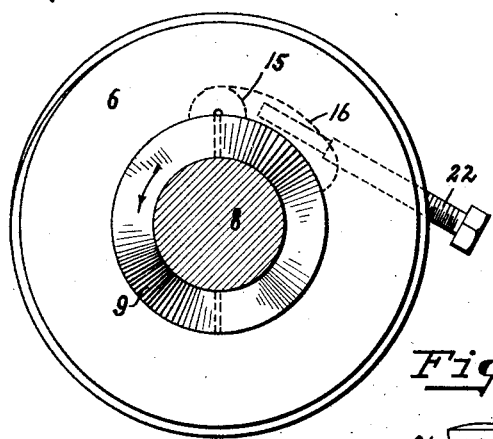
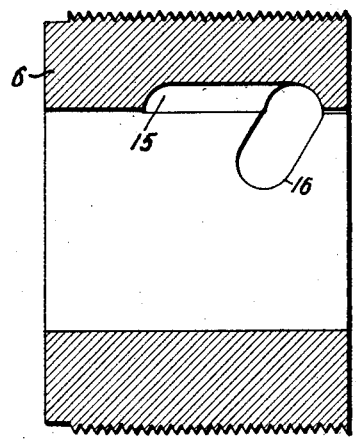
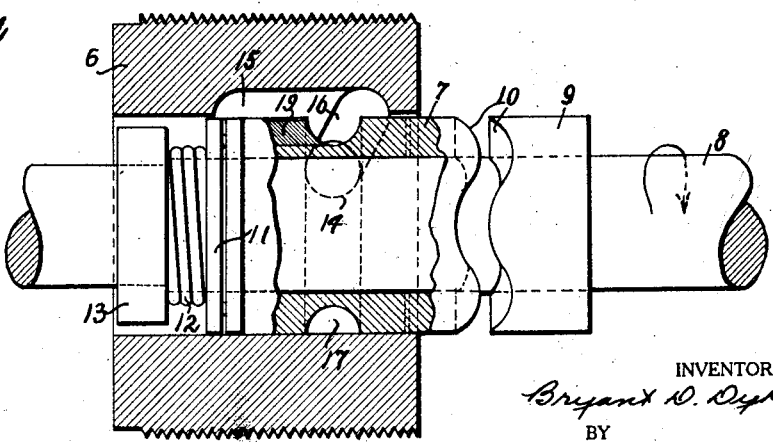
INVENTOR
Bryant D. Dykes
BY
Mayer, Warfield & Watson
ATTORNEY Patented May 1, 1928.

1,667,725

UNITED STATES PATENT OFFICE.

BRYANT D. DYKES, OF HACKENSACK, NEW JERSEY.

VEHICLE CHECKING DEVICE.

Application filed September 30, 1925. Serial No. 59,588.

This invention relates to an improved checking device, and specifically aims to provide a mechanism of this character particularly adapted to be used in association with a rotatable member, particularly the axle of a motor vehicle.

A further object of the invention resides in providing a device of this type by means of which a rearward coasting of the vehicle is automatically prevented, but which will not interfere with the driving of the vehicle in a rearward direction.

An additional object is that of providing a device which will efficiently perform the purpose for which it is intended, and can at will be rendered inoperative, and which will also be economically and readily manufactured and easily assembled.

With these and further objects in mind, the invention accordingly comprises the features of construction, combination of elements and arrangement of parts which will be exemplified in the construction hereinafter set forth and the scope of the application of which will be indicated in the claims.

For a fuller understanding of the nature and objects of the invention reference should be had to the following detailed description of an embodiment applied to a motor vehicle, taken in connection with the accompanying drawing, in which:

Figure 1 is a vertical sectional view of one form of checking device embodying the subject matter of the present invention applied to a motor vehicle, and viewed from the front of the vehicle;

Fig. 2 is a transverse sectional view taken along the lines 2—2 and in the direction of the arrows of Fig. 1;

Fig. 3 is a sectional elevation of one of the units of the device;

Fig. 4 is a view similar to Fig. 1, but showing the parts of the mechanism in a different position; and Fig. 5 is an end elevation of a retaining plug which forms a part of the assembly as shown in the preceding figures.

Although the invention is applicable in an arrangement where a hub or sleeve rotates on a relatively-stationary shaft, yet it will be noted in the illustrated embodiment that the invention has been shown as applied to an arrangement such as would occur in motor vehicles, where an axle rotates in a relatively-stationary housing. While the invention is primarily intended for use in this connection, it will be understood that the same may be employed to advantage in other associations where it is found desirable to embody the functions accomplished by means of a mechanism of this character.

Thus 6 denotes a housing which has a cylindrical bore, and is here the stationary member. In this bore fits freely a sleeve 7 which likewise has a cylindrical bore; and in this latter bore journals a shaft 8. This shaft is in this case one of the axles, and preferably the driven axle, of a motor-vehicle. When the vehicle is going forward, this axle rotates in the direction indicated by the arrow in Figs. 1 and 2. The axle and the sleeve and the bore of the housing are of course concentric; the sleeve is inherently free to rotate independently of the axle and housing, and to be moved longitudinally thereof; but a suitable clutch is provided to function between the axle and the sleeve, and a suitable checking and shifting mechanism between the sleeve and the housing.

The clutch: Opposite the inner end of the sleeve (its right-hand end, in Fig. 1) is a collar 9, secured on the axle, as by a key; and the opposing faces 10 of the sleeve-end and the collar are formed as complementary cam-faces. Adjacent the outer end of the sleeve is a ball-race assembly 11, against which bears one end of a helical expansion-spring 12, which encircles the axle and bears at its other end against a nut or nuts 13 adjustable on the axle to regulate the tension of the spring. The nut is preferably within the bore of the housing. These parts constitute the clutch, by means of which the sleeve is normally caused to rotate with the axle; but when the sleeve is locked against rotation (as by means of the checking and shifting mechanism, to be described below), the axle also cannot rotate except by the application of sufficient power to cause the cam-faces 10 to clear each other and release the clutch, by forcing the sleeve longitudinally of the axle, against the tension of the spring. In practice, the tension of the spring is adjusted at the outset, by means of the nut 13, so that the clutch will not be released by the mere tendency of the normally-loaded vehicle to coast backward down an incline, but will be released by the positive application, in reverse, of the motive-power of the vehicle.

The checking and shifting mechanism consist of a hardened steel ball 14 within an enclosure provided by complementary spaces formed in the housing and the sleeve respectively. More particularly, along the upper side of the bore of the housing is a longitudinal groove 15 of semicircular cross-section and terminating at its inner end with a wall curved on the same radius as the main portion of the groove; and rearwardly from the inner end of said groove (its right-hand end, in Fig. 1) extends a diagonal groove 16, which diverges towards the outer end of the axle, where the spring 12 is carried. And around the exterior of the sleeve is an annular groove 17, which, when the sleeve is in its normal or clutched position (shown in Fig. 1), is in vertical alignment with the pocket formed by the junction of said longitudinal groove 15 and said diagonal groove 16. From this annular groove 17 a longitudinal groove, complementary to longitudinal groove 15, extends along the sleeve to its outer end. To insert the ball, the sleeve is rotated (if necessary) to bring this latter groove to the top where, with the complementary longitudinal groove 15, there is provided a cylindrical passage to said pocket, into which the ball 14 is then introduced. In order to prevent the accidental escape of the ball, the longitudinal groove in the sleeve may be closed by a plug 19, preferably formed with splines 20 to engage suitable undercut channels along the groove; and the plug may have in its outer end a threaded seat 21, to be engaged by a suitable tool (not shown) for withdrawing the plug. To maintain the ball against the front wall of the pocket, when desired, so as not to interfere with the free rotation of the sleeve, there may be provided a headed screw-rod 22, screw-threaded through the wall of the housing and extending into the upper portion of the diagonal groove and towards the ball; and, by manually rotating the head of the screw-rod, the inner end of the rod causes the ball to rest and be maintained against the front wall of the pocket.

This pocket and the grooves 16 and 17 are so disposed that when the ball rests against the forward wall of the pocket it is also resting upon the highest portion or apex of the annular groove, occupying its inoperative or apex position. Naturally the ball (which preferably has a slightly-free fit) tends to roll off this unstable apex-position; and, unless prevented by the screw-rod or some other means, it would instantly roll back until it becomes wedged between the outer wall of the annular groove 17 (at the left-hand side, in Fig. 1) and the inner (or right-hand) wall of the diagonal groove 16.

That is what actually takes place when the motor is shut off, to bring the vehicle to a standstill; and, since the sleeve has now become locked to the stationary housing, and the axle is already clutched to the now-stationary sleeve, rotation of the axle is prevented and the vehicle cannot roll backwards if headed up an incline.

When, however, the vehicle is to go forward and the motor starts the axle to rotating in its normal direction (indicated by the arrows in Figs. 1 and 2), which restores the sleeve to its normal clutch position, and the friction of the now-rotating walls of the annular groove 17 forces the ball 14 up into its apex-position, and maintains it there, where it is inoperative to lock the sleeve to the housing.

If, however, it be desired to back the vehicle under its own power, the power applied to rotate the axle in reverse direction (indicated by the arrow in Fig. 4) is sufficient to overcome the tension of spring 12 and release the clutch, as already stated, so that the vehicle can then be backed by rotating the axle within the now-stationary sleeve.

Finally, the vehicle can be backed by hand, as in rolling it out of a garage, after screwing down the screw-rod 22.

Thus, among other ways, the various features of the invention may be embodied and utilized; and since certain changes may be made in the above construction, and different embodiments of the invention could be made, without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described and all statements of the scope of the invention which as a matter of language might be said to fall therebetween.

Having described my invention, what I claim as new and desire to secure by Letters Patent is:

1. A device of the character described, including, in combination, a shaft to be normally rotated in one direction, means for checking the rotation of the same in an opposite direction, means whereby such shaft may be forcibly rotated in an opposite direction, said second means acting automatically, upon power being applied to said shaft to drive the same in such latter direction, to reset said first-named means for checking rotation in the first-named direction.

2. A device of the character described, including, in combination, a rotatable shaft, a stationary member adjacent said shaft, a clutch, one of the parts of said clutch being connected with said shaft and rotatable therewith, another part of said clutch being positioned adjacent said stationary member, and means for connecting said last-named clutch part and stationary member to check rotative movement of the former when said shaft starts to move in one direction and to permit of such rotative movement when the shaft is moved in an opposite direction.

3. A device of the character described, including, in combination, a rotatable shaft, a stationary member adjacent said shaft, a clutch, one of the parts of said clutch being connected with said shaft and rotatable therewith, another part of said clutch being positioned adjacent said stationary member, means for connecting said last-named clutch part and stationary member to check rotative movement of the former when said shaft starts to move in one direction and to permit of such rotative movement when the shaft is moved in an opposite direction, and means tending to maintain said clutch parts in engaged position.

4. A vehicle checking device, including, in combination, a rotatable shaft, a stationary member adjacent said shaft, a clutch, one of the parts of said clutch being secured to said shaft, another part of said clutch being movably mounted upon said shaft, and means associated with said stationary member tending to move said clutch parts away from each other when said shaft is rotated in one direction, said last-named means being inoperative when said shaft is rotated in an opposite direction.

5. A device of the character described, including, in combination, a rotatable shaft, a stationary member adjacent said shaft, a clutch, one of the parts of said clutch being secured to said shaft, another part of said clutch being movably mounted upon said shaft, means normally tending to maintain said clutch parts in engaged position, and means associated with said stationary member tending to move said clutch parts away from each other when said shaft is rotated in one direction, said last-named means being inoperative when said shaft is rotated in an opposite direction.

6. A device of the character described, including, in combination, a rotatable shaft, a stationary member encircling the same and being formed with a ball-receiving recess, a collar secured to said shaft and being formed with a clutch face, a second collar movably mounted upon said shaft and having a clutch face cooperable with said first-named face, said last-named collar being formed with an annular groove in line with said recess and receiving a portion of the ball retained thereby, and said stationary member being formed with a groove extending at an angle to said first-named groove and communicating with said recess.

7. A device of the character described, including, in combination, a rotatable shaft, a stationary member encircling the same and being formed with a ball-receiving recess, a collar secured to said shaft and being formed with a clutch face, a second collar movably mounted upon said shaft and having a clutch face cooperable with said first-named face, said last-named collar being formed with an annular groove in line with said recess and receiving a portion of the ball retained thereby, said stationary member being formed with a groove extending at an angle to said first-named groove and communicating with said recess, and a spring bearing against said last-named collar in order to normally maintain the clutch faces in engagement with each other.

8. A device of the character described, which comprises, in combination, a member having a cylindrical bore, a cylindrical member located concentrically within said bore, one of said members being revoluble and the other relatively stationary, an interposed sleeve fitting said members but normally free to move longitudinally and axially thereof, a clutch connecting said revoluble member and sleeve, and a sleeve-shifting means connecting said sleeve and stationary member.

9. A device of the character described, which comprises, in combination, a member having a cylindrical bore, a cylindrical member located concentrically within said bore, one of said members being revoluble and the other relatively stationary, an interposed sleeve fitting said members but normally free to move longitudinally and axially thereof, a clutch connecting said revoluble member and sleeve, a sleeve-shifting means connecting said sleeve and stationary member, and manually-operated means for rendering said shifting means inoperative at will.

In testimony whereof, I affix my signature.

BRYANT D. DYKES.